United States Patent
Ogasawara et al.

(10) Patent No.: US 8,822,076 B2
(45) Date of Patent: Sep. 2, 2014

(54) NON-AQUEOUS ELECTROLYTIC SECONDARY BATTERY AND POSITIVE ELECTRODE FOR NON-AQUEOUS ELECTROLYTIC SECONDARY BATTERY

(75) Inventors: Takeshi Ogasawara, Kobe (JP);
Kentaro Takahashi, Sumoto (JP);
Naoki Imachi, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 621 days.

(21) Appl. No.: 12/985,169

(22) Filed: Jan. 5, 2011

(65) Prior Publication Data

US 2011/0165453 A1   Jul. 7, 2011

(30) Foreign Application Priority Data

Jan. 6, 2010   (JP) ................. 2010-001322

(51) Int. Cl.
*H01M 4/00*   (2006.01)
*H01M 4/13*   (2010.01)
*H01M 4/58*   (2010.01)
*H01M 4/62*   (2006.01)

(52) U.S. Cl.
USPC .................. 429/223; 429/218.1; 429/231.95; 429/232; 429/245

(58) Field of Classification Search
USPC .................. 429/223, 231.95, 245, 218.1, 232
See application file for complete search history.

(56) References Cited

U.S. PATENT DOCUMENTS

2006/0177739 A1   8/2006   Endo et al.
2007/0207384 A1   9/2007   Nakura (Continued)

FOREIGN PATENT DOCUMENTS

CN   1816928 A   8/2006
JP   07-192721 A   7/1995

(Continued)

OTHER PUBLICATIONS

English abstract and machine translation of Japanese application 09-199122, previously cited on Jan. 5, 2011 (24 pages).

(Continued)

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

A nonaqueous electrolytic secondary battery and a positive electrode for a nonaqueous electrolytic secondary battery are provided. The positive electrode includes a positive electrode active material layer containing a positive electrode active material and a coupling agent represented by a general formula (1). The positive electrode active material includes lithium transition metal oxide particles. At least one rare-earth compound selected from the rare-earth compound group consisting of specific rare-earth hydroxides and specific rare-earth oxyhydroxides is fixed on the surfaces of the lithium transition metal oxide particles in a dispersed form.

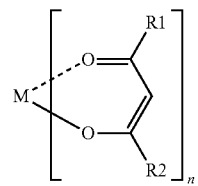

(1)

16 Claims, 4 Drawing Sheets

(56) References Cited

U.S. PATENT DOCUMENTS

| | | |
|---|---|---|
| 2008/0166635 A1 | 7/2008 | Miyamoto et al. |
| 2008/0233477 A1 | 9/2008 | Takahashi et al. |
| 2009/0136854 A1 | 5/2009 | Nakura |
| 2011/0117434 A1* | 5/2011 | Ogasawara et al. ........... 429/223 |

FOREIGN PATENT DOCUMENTS

| | | |
|---|---|---|
| JP | 9-199112 A | 7/1997 |
| JP | 2007-018874 A | 1/2007 |
| JP | 2007-242303 A | 9/2007 |
| JP | 2008-235090 A | 10/2008 |
| WO | 2005/008812 A1 | 1/2005 |

OTHER PUBLICATIONS

Japanese Office Action dated Nov. 27, 2013, issued in corresponding Japanese application No. 2010-001322 (3 pages).

Japanese Office Action dated Mar. 5, 2014, issued in corresponding Japanese application No. 2010-001322 (4 pages).

Chinese Office Action dated Dec. 19, 2013, issued in corresponding Chinese application No. 201110009072.9 with English translation of Search Report (12 pages).

* cited by examiner

NON-AQUEOUS ELECTROLYTIC SECONDARY BATTERY AND POSITIVE ELECTRODE FOR NON-AQUEOUS ELECTROLYTIC SECONDARY BATTERY

CROSS REFERENCE TO RELATED APPLICATIONS

This application claims priority to Japanese Patent Application No. 2010-001322 filed in the Japan Patent Office on Jan. 6, 2010, the entire contents of which are incorporated herein by reference.

BACKGROUND OF THE INVENTION

1. Field of the Invention

The present invention relates to a nonaqueous electrolytic secondary battery and a positive electrode for a nonaqueous electrolytic secondary battery; in particular, to a nonaqueous electrolytic secondary battery having improved characteristics under continuous charging and a positive electrode for such a nonaqueous electrolytic secondary battery.

2. Description of Related Art

In recent years, a decrease in the size and weight of mobile terminal devices such as cellular phones, notebook computers, and personal digital assistants (PDAs) has been rapidly achieved. With such a trend, there has been a demand to further increase in the capacity of batteries serving as driving power supplies of such mobile terminal devices. Lithium-ion batteries, which are configured to be charged and discharged through migration of lithium ions between the positive electrode and the negative electrode, have high energy density and high capacity. Accordingly, lithium-ion batteries are widely used as driving power supplies of such mobile terminal devices.

As mobile terminal devices have been made to have greater functionality, such as the function of replaying videos or the function of letting users play games, there has been a trend toward a further increase in the power consumption of the mobile terminal devices. Thus, there has been a strong demand for a further increase in the capacity of batteries. To increase the capacity of a nonaqueous electrolytic secondary battery, in addition to a method for increasing the capacity of the active material and a method for increasing the amount of the active material packed per unit volume, there is a method for increasing the charging voltage of the battery. However, when the charging voltage of a battery is increased, the electrolytic solution of the battery tends to decompose. In particular, when such a battery is stored at high temperature or is continuously charged, the electrolytic solution decomposes to generate gas, which swells the battery or increases the internal pressure of the battery. In consideration of such problems, the following batteries have been proposed.

Japanese Published Unexamined Patent Application No. 2007-242303 (Patent Document 1) proposes a battery in which a lithium composite oxide represented by $Li_xM_{1-y}L_yO_2$ where L represents an element selected from the group consisting of the rare-earth elements, group IIIb elements, and group IVb elements has been treated with a coupling agent and remaining bonding groups of the coupling agent without being bonded to the lithium composite oxide have been inactivated. Patent Document 1 states that such a battery has an enhanced cycling characteristic when the battery is intermittently cycled under an environment at a high temperature.

In addition, to achieve the same object as in Patent Document 1, Japanese Published Unexamined Patent Application No. 2007-18874 (Patent Document 2) proposes a battery in which a lithium composite oxide represented by $Li_xM_{1-y}L_yO_2$ where L represents an element selected from the group consisting of the rare-earth elements, group IIIb elements, and group IVb elements is used; the surface layer of the active material contains at least one element Le selected from the group consisting of Al, Mn, Ti, Mg, Zr, Nb, Mo, W, and Y; and the active material has been surface-treated with a coupling agent.

Furthermore, Japanese Published Unexamined Patent Application No. 9-199112 (Patent Document 3) proposes a battery in which the positive electrode mixture and the like contain an aluminum coupling agent. Patent Document 3 states that, as a result, the adhesion of the positive electrode is enhanced and hence a cycling characteristic of the battery can be enhanced.

BRIEF SUMMARY OF THE INVENTION

However, according to the techniques of Patent Documents 1 and 3, since positive electrodes merely contain coupling agents, no stable film is formed on the surfaces of the positive electrode active materials. According to the technique of Patent Document 2, a positive electrode contains a coupling agent and a compound containing an element such as Al is fixed on the surface of the positive electrode active material. However, after the compound has been fixed, the positive electrode active material is heat-treated at a high temperature (for example, 650° C.). As a result, the element such as Al is diffused in the positive electrode active material; or even when the element is present on the surface of the positive electrode active material, the element is in the form of an oxide. Accordingly, no stable film is formed on the surface of the positive electrode active material. Therefore, the above-described techniques have problems in that, in particular, storage characteristics of batteries at a high temperature cannot be enhanced and characteristics of batteries under continuous charging cannot be enhanced.

Accordingly, an object of the present invention is to provide a nonaqueous electrolytic secondary battery in which, even under storage at a high temperature or continuous charging, a decrease in the capacity and the generation of gas are suppressed; and a positive electrode for such a nonaqueous electrolytic secondary battery.

According to an aspect of the present invention, a positive electrode for a nonaqueous electrolytic secondary battery includes a positive electrode active material layer, wherein the positive electrode active material layer contains a positive electrode active material and at least one coupling agent represented by a general formula (1) below, the positive electrode active material includes lithium transition metal oxide particles that contain nickel and/or cobalt, and at least one rare-earth compound. The rare earth compound is preferably a hydroxide or an oxyhydroxide of a rare earth compound. More preferably, the rare earth compound is selected from the rare-earth compound group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, yttrium oxyhydroxide, scandium hydroxide, and scandium oxyhydroxide, is fixed on surfaces of the lithium transition metal oxide particles in a dispersed form.

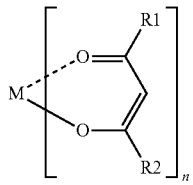

In general formula (1), M represents Al to which a functional group may be bonded; R1 and R2 each independently represent an alkyl group including 18 or less carbon atoms or an alkoxy group including 18 or less carbon atoms; R1 and R2 may be the same as or different from each other; the alkyl group and the alkoxy group may be independently linear or branched, substituted or unsubstituted; n is an integer 1, 2 or 3; and when n is 2 or 3, a plurality of R1 may be the same as or different from each other and a plurality of R2 may be the same as or different from each other.

As described above, in the positive electrode, the positive electrode active material layer contains a coupling agent (aluminum coupling agent) represented by the general formula (1); and at least one rare-earth compound (hereafter, sometimes simply referred to as "rare-earth compound") selected from the rare-earth compound group consisting of the rare-earth hydroxides and the rare-earth oxyhydroxides is fixed on the surfaces of the lithium transition metal oxide particles in a dispersed form (that is, the rare-earth compound is not present in the following state: the rare-earth element of the rare-earth compound is diffused in the positive electrode active material or the rare-earth compound in the form of an oxide is present on the surfaces of the lithium transition metal oxide particles.). In the positive electrode, the coupling agent selectively coordinates with the rare-earth compound fixed on the surfaces of the lithium transition metal oxide particles. Thus, a stable film is formed around the rare-earth compound. In addition, due to the interaction between the coupling agent and the rare-earth compound, the catalytic property of decomposing the electrolytic solution is suppressed and the decomposition of the electrolytic solution can be considerably suppressed. As a result, a battery in which the generation of gas and a decrease in the capacity are suppressed under continuous charging can be provided.

The above-described rare-earth compound group preferably consists of erbium hydroxide, erbium oxyhydroxide, lanthanum hydroxide, and lanthanum oxyhydroxide.

When erbium hydroxide and/or erbium oxyhydroxide is used as the rare-earth compound, the above-described advantage is enhanced. When lanthanum hydroxide and/or lanthanum oxyhydroxide is used as the rare-earth compound, since lanthanum is inexpensive, the production cost of the positive electrode can be reduced.

The above-described "at least one rare-earth compound" preferably has an average particle size of 1 nm or more and 100 nm or less.

The reasons for preferably controlling the average size of rare-earth compound particles within this range are as follows. When the average particle size is more than 100 nm, there may be cases where the size of the rare-earth compound particles is too large relative to the size of the lithium transition metal oxide particles and hence the rare-earth compound does not densely cover the surfaces of the lithium transition metal oxide particles. Thus, the area where the lithium transition metal oxide particles are in direct contact with the nonaqueous electrolyte or reductive decomposition products of the nonaqueous electrolyte is increased and hence oxidative decomposition of the nonaqueous electrolyte or reductive decomposition products of the nonaqueous electrolyte is increased and charging-discharging characteristics are degraded. When the average particle size is less than 1 nm, there may be cases where the rare-earth hydroxide or the like too densely covers the surfaces of the lithium transition metal oxide particles. Thus, the capability of occluding and releasing lithium ions in the surfaces of the lithium transition metal oxide particles is degraded and hence charging-discharging characteristics are degraded. Accordingly, more preferably, the above-described "at least one rare-earth compound" has an average particle size of 10 nm or more and 50 nm or less.

The above-described coupling agent is preferably at least one selected from the group consisting of aluminum bis(ethyl acetoacetate)mono(acetylacetonate), aluminum ethyl acetate diisopropylate, and aluminum tris(ethyl acetoacetate).

This is because, when such a coupling agent is used, the above-described advantage is enhanced.

According to another aspect of the present invention, a nonaqueous electrolytic secondary battery includes a positive electrode containing positive electrode active material particles containing a lithium transition metal oxide that contains nickel and/or cobalt; a negative electrode; a separator; a nonaqueous electrolytic solution; and a casing within which the positive electrode, the negative electrode, the separator, and the nonaqueous electrolytic solution are disposed, wherein at least one rare-earth compound and a coupling agent represented by a general formula (1) below is contained within the casing. The rare earth compound is preferably a hydroxide or a oxyhydroxide of a rare earth compound. More preferably, the rare earth compound is selected from the rare-earth compound group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, yttrium oxyhydroxide, scandium hydroxide, and scandium oxyhydroxide, is fixed on surfaces of the positive electrode active material particles in a dispersed form.

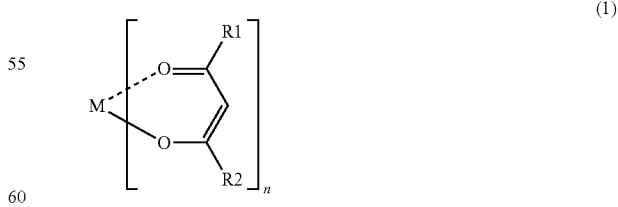

In this general formula (1), M represents Al to which a functional group may be bonded; R1 and R2 each independently represent an alkyl group including 18 or less carbon atoms or an alkoxy group including 18 or less carbon atoms; R1 and R2 may be the same as or different from each other; the alkyl group and the alkoxy group may be independently linear or branched, substituted or unsubstituted; n is an integer of 1, 2 or 3; and when n is 2 or 3, a plurality of R1 may be the same as or different from each other and a plurality of R2 may be the same as or different from each other.

As described above, the coupling agent is not necessarily contained within the positive electrode and it will suffice that the coupling agent is contained within the casing (within the battery). For example, the coupling agent may be contained in the nonaqueous electrolytic solution, or an additional member containing the coupling agent may be disposed within the battery. However, when the coupling agent is contained within the positive electrode, a good film is smoothly formed on the surfaces of the positive electrode active material particles. Accordingly, the coupling agent is preferably contained within the positive electrode.

Additional Descriptions (1) A coupling agent used in an embodiment of the present invention is not restricted to those described above and may be aluminum mono(isopropoxy) mono(oleoxy)ethyl acetoacetate, aluminum tris(acetylacetate), or the like. As for the above-described five coupling agents, R1, R2, and functional groups (other than R1 and R2) that may be directly bonded to M in the general formula (1) are summarized in Table 1 below.

to be applied to an aluminum foil, or a technique in which a positive electrode plate including a positive electrode active material layer is immersed in a solution containing the coupling agent and a solvent so as to be impregnated with the coupling agent and then the solvent is removed from the positive electrode plate.

(4) Positive electrode active material particles on the surfaces of which fine particles of a rare-earth compound are fixed in a dispersed form may be provided by, for example, a production method including a step of precipitating a hydroxide of a rare-earth element in a solution in which the positive electrode active material particles are dispersed and fixing the hydroxide on the surfaces of the positive electrode active material particles. Specifically, the hydroxide can be precipitated by adding a water-soluble salt of the rare-earth element such as a nitrate or a sulfate to a suspension in which the positive electrode active material particles have been dispersed; and further adding an alkaline aqueous solution of sodium hydroxide, potassium hydroxide, or the like to the suspension so that the pH of the suspension is adjusted to be in the range of, for example, 6 to 13.

(5) After a hydroxide of a rare-earth element is fixed on the surfaces of positive electrode active material particles as described above, the positive electrode active material par-

TABLE 1

| Compound | R1 | R2 | R1 | R2 | Another functional group 1 | Another functional group 2 |
|---|---|---|---|---|---|---|
| Aluminum bis(ethyl acetoacetate) mono(acetylacetonate) | $CH_3$ | $OCH_2CH_3$ | $CH_3$ | $CH_3$ | — | — |
| Aluminum ethyl acetate diisopropylate | $CH_3$ | $OCH_2CH_3$ | — | — | $OCH(CH_3)_2$ | $OCH(CH_3)_2$ |
| Aluminum tris(ethyl acetoacetate) | $CH_3$ | $OCH_2CH_3$ | — | — | — | — |
| Aluminum tris(acetylacetate) | $CH_3$ | $CH_3$ | — | — | — | — |
| Aluminum mono(isopropoxy) mono(oleoxy) ethyl acetoacetate | $CH_3$ | $OCH_2CH_3$ | — | — | $OCH(CH_3)_2$ | $O(CH_2)_8CH{=}CH(CH_2)_7CH_3$ |

The compounds of Table 1 are exemplary and are non-limiting. R1, R2 and the another functional groups 1 and 2 are not restricted to those groups described in Table 1. The another functional group may be any alkoxy group.

(2) When the positive electrode is made to contain a coupling agent, the amount of the coupling agent added is preferably 0.03 mass % or more and 1.5 mass % or less relative to the entire amount of the positive electrode active material. When the amount is less than 0.03 mass %, there may be cases where the amount of the coupling agent is so small that the decomposition reaction of the electrolytic solution cannot be sufficiently suppressed. When the amount is more than 1.5 mass %, there may be cases where the amount of the coupling agent is so large that, for example, when the positive electrode active material contains cobalt, the coupling agent coordinates with not only a rare-earth compound but also cobalt and a film is excessively formed and hence the discharging performance is degraded. Accordingly, the amount of the coupling agent added is more preferably 0.1 mass % or more and 0.6 mass % or less and, still more preferably, 0.2 mass % or more and 0.4 mass % or less.

(3) A coupling agent is made to be contained in the positive electrode by, for example, a technique in which the coupling agent is mixed with a positive electrode active material slurry ticles are generally subjected to a heat treatment. In general, the temperature of this heat treatment is preferably in the range of 80° C. or more and 500° C. or less and, more preferably, in the range of 80° C. or more and 400° C. or less.

When the temperature of the heat treatment is more than 500° C., a rare-earth compound is made to be present as an oxide on the surfaces of positive electrode active material particles and, in addition, fine particles of the rare-earth compound fixed on the surfaces are partially diffused in the active material. As a result, the initial charging-discharging efficiency is degraded. Furthermore, since the rare-earth compound is made to be present not as a hydroxide or an oxyhydroxide but as an oxide, a coupling agent cannot selectively coordinate with the rare-earth compound and hence a stable film cannot be formed. Specific heat-treatment temperatures for various rare-earth compounds will be described in (6) below.

(6) Examples of a rare-earth compound that is fixed on the surfaces of positive electrode active material particles include the hydroxides and oxyhydroxides of erbium, ytterbium, terbium, dysprosium, holmium, thulium, lutetium, neodymium, samarium, praseodymium, europium, gadolinium, lanthanum, yttrium, and the like. Specific heat-treatment temperatures for positive electrode active material particles on which the hydroxides of these rare earths have been precipitated will be described below.

Erbium Hydroxide

The temperature at which erbium hydroxide decomposes into erbium oxyhydroxide is about 230° C. and the temperature at which erbium oxyhydroxide decomposes into erbium oxide is about 440° C. When positive electrode active material particles on which erbium hydroxide has been precipitated are heat-treated at 440° C. or more, erbium hydroxide turns into erbium oxide and erbium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which erbium hydroxide has been precipitated are heat-treated, the heat-treatment temperature is preferably controlled to be less than 440° C.

Ytterbium Hydroxide

Ytterbium hydroxide was subjected to thermogravimetric analysis in which heat-treatment temperature was increased at a rate of 5° C. per minute. As a result, inflection points of variation in the weight were observed at about 230° C. and about 400° C.; and variation in the weight was small and stabilized at about 500° C. This is probably because ytterbium hydroxide started to decompose into ytterbium oxyhydroxide at about 230° C.; ytterbium oxyhydroxide started to decompose into ytterbium oxide at about 400° C.; and ytterbium hydroxide turned into ytterbium oxide at about 500° C.

Thus, when positive electrode active material particles on which ytterbium hydroxide has been precipitated are heat-treated at 400° C. or more, ytterbium oxyhydroxide starts to turn into ytterbium oxide; and at 500° C. or more, ytterbium hydroxide turns into ytterbium oxide and ytterbium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which ytterbium hydroxide has been precipitated are heat-treated, the heat-treatment temperature is preferably controlled to be less than 500° C. and, more preferably, less than 400° C.

Terbium Hydroxide

The temperature at which terbium hydroxide decomposes into terbium oxyhydroxide is about 295° C. and the temperature at which terbium oxyhydroxide decomposes into terbium oxide is about 395° C. When positive electrode active material particles on which terbium hydroxide has been precipitated are heat-treated at 395° C. or more, terbium hydroxide turns into terbium oxide and terbium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which terbium hydroxide has been precipitated are heat-treated, the heat-treatment temperature is preferably controlled to be less than 395° C.

Dysprosium Hydroxide

The temperature at which dysprosium hydroxide decomposes into dysprosium oxyhydroxide is about 275° C. and the temperature at which dysprosium oxyhydroxide decomposes into dysprosium oxide is about 450° C.

When positive electrode active material particles on which dysprosium hydroxide has been precipitated are heat-treated at 450° C. or more, dysprosium hydroxide turns into dysprosium oxide and dysprosium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which dysprosium hydroxide has been precipitated are heat-treated, the heat-treatment temperature is preferably controlled to be less than 450° C.

Holmium Hydroxide

The temperature at which holmium hydroxide decomposes into holmium oxyhydroxide is about 265° C. and the temperature at which holmium oxyhydroxide decomposes into holmium oxide is about 445° C.

When positive electrode active material particles on which holmium hydroxide has been precipitated are heat-treated at 445° C. or more, holmium hydroxide turns into holmium oxide and holmium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which holmium hydroxide has been precipitated are heat-treated, the heat-treatment temperature is preferably controlled to be less than 445° C.

Thulium Hydroxide

The temperature at which thulium hydroxide decomposes into thulium oxyhydroxide is about 250° C. and the temperature at which thulium oxyhydroxide decomposes into thulium oxide is about 405° C.

When positive electrode active material particles on which thulium hydroxide has been precipitated are heat-treated at 405° C. or more, thulium hydroxide turns into thulium oxide and thulium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which thulium hydroxide has been precipitated are heat-treated, the heat-treatment temperature is preferably controlled to be less than 405° C.

Lutetium Hydroxide

Lutetium hydroxide was subjected to thermogravimetric analysis and it was found that the temperature at which lutetium hydroxide decomposes into lutetium oxyhydroxide is about 280° C. and the temperature at which lutetium oxyhydroxide decomposes into lutetium oxide is about 405° C.

When positive electrode active material particles on which lutetium hydroxide has been precipitated are heat-treated at 405° C. or more, lutetium hydroxide turns into lutetium oxide and lutetium diffuses in the positive electrode active material particles. In such a case, it is difficult to sufficiently suppress the reaction between the positive electrode active material and the nonaqueous electrolytic solution and charging-discharging characteristics of the positive electrode active material are considerably degraded.

Accordingly, when positive electrode active material particles on which lutetium hydroxide has been precipitated are heat-treated, the heat-treatment temperature is preferably controlled to be less than 405° C.

Neodymium Hydroxide

Neodymium hydroxide turns into neodymium oxyhydroxide in a temperature range of 335° C. to 350° C. and turns into neodymium oxide in a temperature range of 440° C. to 485° C.

When positive electrode active material particles on the surfaces of which neodymium hydroxide has been precipitated are heat-treated at 440° C. or more, neodymium hydroxide turns into neodymium oxide and neodymium diffuses in the positive electrode active material particles. In such a case, neodymium oxide does not provide the advantage that is provided by neodymium hydroxide or neodymium oxyhydroxide and hence characteristics of the positive electrode active material are degraded and characteristics such as charging-discharging efficiency are degraded.

Accordingly, when positive electrode active material particles on the surfaces of which neodymium hydroxide has been precipitated are heat-treated, the heat-treatment temperature is preferably controlled to be less than 440° C.

Samarium Hydroxide

Samarium hydroxide turns into samarium oxyhydroxide in a temperature range of 290° C. to 330° C. and turns into samarium oxide in a temperature range of 430° C. to 480° C.

When positive electrode active material particles on the surfaces of which samarium hydroxide has been precipitated are heat-treated at 430° C. or more, samarium hydroxide turns into samarium oxide and samarium diffuses in the positive electrode active material particles. In such a case, samarium oxide does not provide the advantage that is provided by samarium hydroxide or samarium oxyhydroxide and hence characteristics of the positive electrode active material are degraded and characteristics such as charging-discharging efficiency are degraded.

Accordingly, when positive electrode active material particles on the surfaces of which samarium hydroxide has been precipitated are heat-treated, the heat-treatment temperature is preferably controlled to be less than 430° C.

Praseodymium Hydroxide

When praseodymium hydroxide is used, after praseodymium hydroxide is precipitated on the surfaces of positive electrode active material particles, the positive electrode active material particles are preferably heat-treated also for the purpose of removing water. In this case, when the positive electrode active material particles on the surfaces of which praseodymium hydroxide has been precipitated are heat-treated at 310° C. or more, praseodymium hydroxide turns into praseodymium oxide and the advantage that is provided by praseodymium hydroxide is not provided.

Accordingly, when positive electrode active material particles on the surfaces of which praseodymium hydroxide has been precipitated are heat-treated, the heat-treatment temperature is preferably controlled to be less than 310° C.

Europium Hydroxide

Europium hydroxide turns into europium oxyhydroxide at about 305° C. and turns into europium oxide at about 470° C.

When positive electrode active material particles on the surfaces of which europium hydroxide has been precipitated are heat-treated at 470° C. or more, europium hydroxide turns into europium oxide and europium diffuses in the positive electrode active material particles. In such a case, europium oxide does not provide the advantage that is provided by europium hydroxide or europium oxyhydroxide and hence characteristics of the positive electrode active material are degraded and characteristics such as charging-discharging efficiency are degraded.

Accordingly, when positive electrode active material particles on the surfaces of which europium hydroxide has been precipitated are heat-treated, the heat-treatment temperature is preferably controlled to be less than 470° C.

Gadolinium Hydroxide

Gadolinium hydroxide turns into gadolinium oxyhydroxide in a temperature range of 218° C. to 270° C. and turns into gadolinium oxide in a temperature range of 420° C. to 500° C.

When positive electrode active material particles on the surfaces of which gadolinium hydroxide has been precipitated are heat-treated at 420° C. or more, gadolinium hydroxide turns into gadolinium oxide and gadolinium diffuses in the positive electrode active material particles. In such a case, gadolinium oxide does not provide the advantage that is provided by gadolinium hydroxide or gadolinium oxyhydroxide and hence characteristics of the positive electrode active material are degraded and characteristics such as charging-discharging efficiency are degraded.

Accordingly, when positive electrode active material particles on the surfaces of which gadolinium hydroxide has been precipitated are heat-treated, the heat-treatment temperature is preferably controlled to be less than 420° C.

Lanthanum Hydroxide

Lanthanum hydroxide turns into lanthanum oxyhydroxide in a temperature range of 310° C. to 365° C. and lanthanum oxyhydroxide turns into lanthanum oxide in a temperature range of 460° C. to 510° C. When positive electrode active material particles on the surfaces of which lanthanum hydroxide has been precipitated are heat-treated at 600° C. or more, lanthanum hydroxide turns into lanthanum oxide and the advantage that is provided by lanthanum hydroxide or lanthanum oxyhydroxide is not provided. In addition, lanthanum has diffused in the positive electrode active material particles and hence characteristics of the positive electrode active material are degraded and characteristics such as charging-discharging efficiency are degraded.

Accordingly, when positive electrode active material particles on the surfaces of which lanthanum hydroxide has been precipitated are heat-treated, the heat-treatment temperature is preferably controlled to be less than 460° C.

Yttrium Hydroxide

Yttrium hydroxide turns into yttrium oxyhydroxide at about 260° C. and turns into yttrium oxide at about 450° C. When positive electrode active material particles on the surfaces of which yttrium hydroxide has been precipitated are heat-treated at 450° C. or more, yttrium hydroxide turns into yttrium oxide and the advantage that is provided by yttrium hydroxide or yttrium oxyhydroxide is not provided. In addition, yttrium has diffused in the positive electrode active material particles and hence characteristics of the positive electrode active material are degraded and characteristics such as charging-discharging efficiency are degraded.

Accordingly, when positive electrode active material particles on the surfaces of which yttrium hydroxide has been precipitated are heat-treated, the heat-treatment temperature is preferably controlled to be less than 450° C.

For easy understanding, the temperatures at which the hydroxides of the rare earths turn into the oxyhydroxides of the rare earths and the temperatures at which the hydroxides of the rare earths turn into the oxides of the rare earths are summarized in Table 2 below.

TABLE 2

| Rare-earth hydroxide | Temperature at which hydroxide turns into oxyhydroxide | Temperature at which hydroxide turns into oxide |
|---|---|---|
| Erbium hydroxide | About 230° C. | About 440° C. |
| Ytterbium hydroxide | About 230° C. | About 400° C. |
| Terbium hydroxide | About 295° C. | About 395° C. |
| Dysprosium hydroxide | About 275° C. | About 450° C. |
| Holmium hydroxide | About 265° C. | About 445° C. |
| Thulium hydroxide | About 250° C. | About 405° C. |
| Lutetium hydroxide | About 280° C. | About 405° C. |
| Neodymium hydroxide | 335° C. to 350° C. | 440° C. to 485° C. |
| Samarium hydroxide | 290° C. to 330° C. | 430° C. to 480° C. |
| Praseodymium hydroxide | — | About 310° C. |
| Europium hydroxide | About 305° C. | About 470° C. |
| Gadolinium hydroxide | 218° C. to 270° C. | 420° C. to 500° C. |
| Lanthanum hydroxide | 310° C. to 365° C. | 460° C. to 510° C. |
| Yttrium hydroxide | About 260° C. | About 450° C. |

The compounds listed in Table 2 are exemplary and are non-limiting. For example, other rare earth hydroxides or oxyhydroxides, including the hydroxide and/or oxyhydroxide of scandium, may be used.

(7) The amount of a rare-earth compound fixed relative to the entire amount of a positive electrode active material is preferably 0.005 mass % or more and 0.5 mass % or less in terms of rare-earth element. When the amount of a rare-earth compound fixed is less than 0.005 mass %, there may be cases where this amount is too small and enhancement of discharging characteristics after continuous charging is not sufficiently achieved. When the amount of a rare-earth compound fixed is more than 0.5 mass %, there may be cases where the surface of a positive electrode active material is excessively covered with fine particles of the rare-earth compound that do not contribute to charging-discharging reactions and hence discharging characteristics are degraded. Accordingly, more preferably, the amount of a rare-earth compound fixed relative to the entire amount of a positive electrode active material is 0.01 mass % or more and 0.3 mass % or less.

(8) A positive electrode active material used in an embodiment of the present invention is a lithium transition metal oxide containing a transition metal such as cobalt, nickel, or manganese. Specifically, examples of the positive electrode active material include lithium cobaltate, Ni—Co—Mn lithium composite oxides, Ni—Mn—Al lithium composite oxides, and Ni—Co—Al lithium composite oxides. Such positive electrode active materials may be used alone or in combination as a mixture thereof.

(9) A negative electrode active material used in an embodiment of the present invention is not particularly restricted as long as it can be used as a negative electrode active material for a nonaqueous electrolytic secondary battery. Examples of such a negative electrode active material include carbon materials such as graphite and coke; tin oxide; metal lithium; metals that can form alloys with lithium such as silicon; and alloys of such metals.

(10) A nonaqueous electrolytic solution used in an embodiment of the present invention is not particularly restricted as long as it can be used for a nonaqueous electrolytic secondary battery. In general, such a nonaqueous electrolytic solution contains a supporting electrolyte and a solvent. Examples of the supporting electrolyte include $LiBF_4$, $LiPF_6$, $LiN(SO_2CF_3)_2$, $LiN(SO_2C_2F_5)_2$, and $LiPF_{6-x}(C_nF_{2n+1})_x$ where $1<x<6$ and $n=1$ or 2. These supporting electrolytes may be used alone or in combination as a mixture thereof. The concentration of such a supporting electrolyte is not particularly restricted; however, the concentration is preferably in the range of 0.8 to 1.5 mol/l. Preferred examples of the solvent include carbonate solvents such as ethylene carbonate, propylene carbonate, γ-butyrolactone, diethylene carbonate, ethyl methyl carbonate, and dimethyl carbonate; and carbonate solvents in which the hydrogen atoms of these solvents are partially substituted with fluorine atoms. A solvent containing both a cyclic carbonate and a linear carbonate is preferably used.

According to an embodiment of the present invention, a battery is provided that has an excellent advantage in which, even under storage at high temperature or continuous charging, a decrease in the capacity and the generation of gas are suppressed.

DETAILED DESCRIPTION OF THE INVENTION

Hereinafter, the present invention will be described in detail with reference to examples. However, the present invention is not restricted to the following examples at all and the examples can be appropriately modified without departing from the spirit and scope of the present invention.

Preparation of Positive Electrode (1) Formation of Erbium Oxyhydroxide Coating by Wet Process A suspension in which lithium cobaltate was dispersed was prepared by adding 1,000 g of lithium cobaltate that formed a solid solution with 1.5 mol % Mg and 1.5 mol % Al and contained 0.05 mol % Zr, to 1.5 liters of pure water and by stirring the resultant mixture. Then, a solution prepared by dissolving 3.18 g of erbium nitrate pentahydrate in 200 mL of pure water was added to the suspension. At this time, to adjust the pH of the solution in which lithium cobaltate was dispersed to 9, a 10 mass % aqueous solution of sodium hydroxide was appropriately added to the solution. Then, after the erbium nitrate pentahydrate solution was added, the resultant solution was subjected to suction filtration and the filtration residue was rinsed and then dried at 120° C. to provide a powder in which lithium cobaltate particles (positive electrode active material particles) on the surfaces of which erbium hydroxide was uniformly fixed. Subsequently, the powder was heat-treated at 300° C. for 5 hours in the air. As a result of such a heat treatment at 300° C., the entirety of or most of erbium hydroxide turns into erbium oxyhydroxide and hence erbium oxyhydroxide is fixed on the surfaces of the positive electrode active material particles in a dispersed form. However, there are cases where a part of erbium hydroxide remains without turning into erbium oxyhydroxide and erbium hydroxide is present on the surfaces of the positive electrode active material particles.

Figure 4:
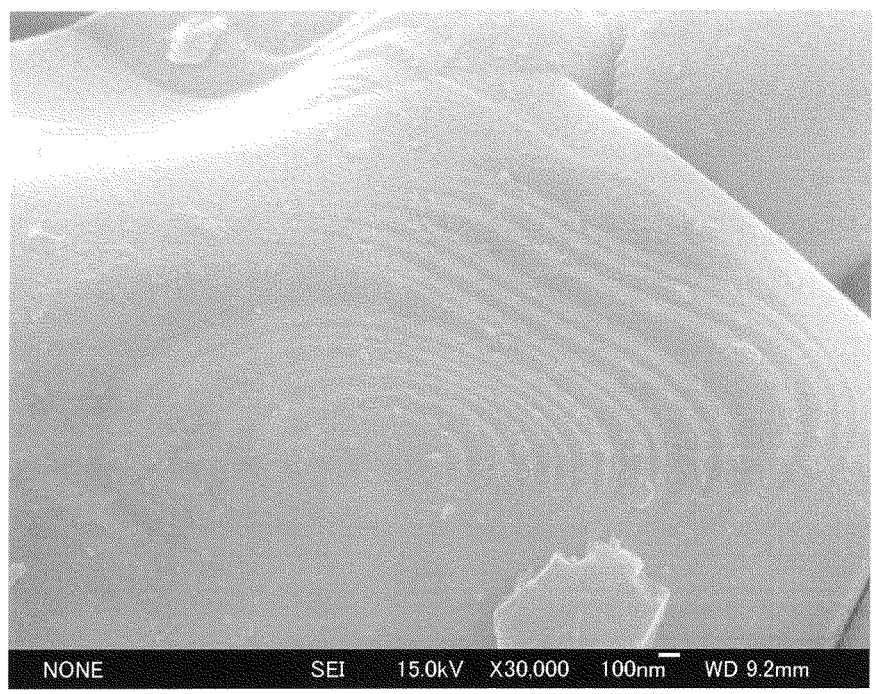
FIG. 4 is a photograph of a positive electrode active material according to an embodiment of the present invention, the photograph being taken with a scanning electron microscope (SEM).
Figure 5:
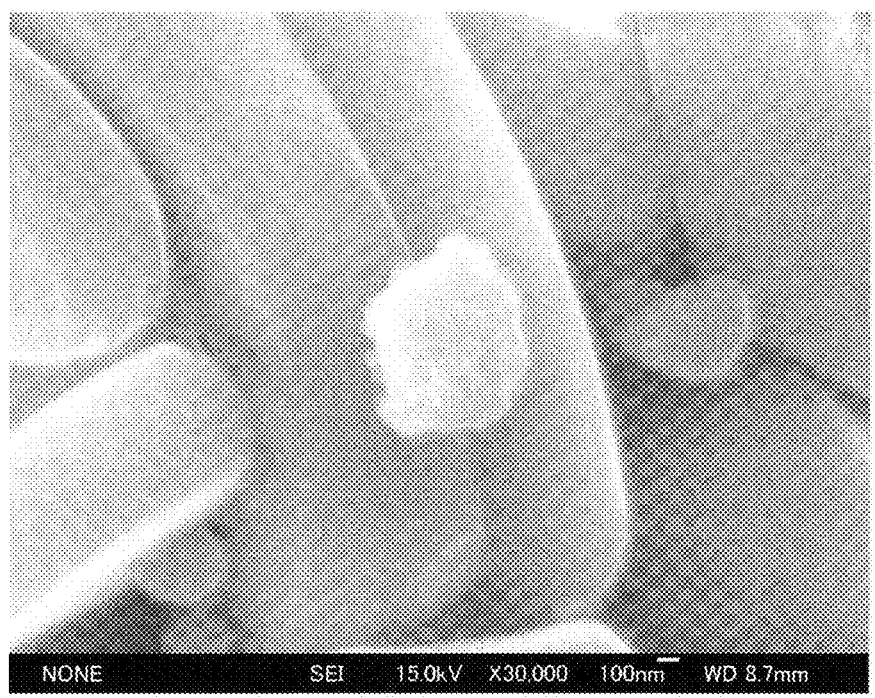
FIG. 5 is a photograph of a positive electrode active material to which a rare-earth compound has been made to adhere by a dry process, the photograph being taken with a scanning electron microscope (SEM).

The resultant positive electrode active material was observed with a scanning electron microscope (SEM). As a result, as illustrated in FIG. 4, erbium compound (erbium oxyhydroxide) particles having an average size of 100 nm or less were fixed in a uniformly dispersed form on the surface of the positive electrode active material. For comparison, an SEM photograph of a positive electrode active material that was mixed with erbium oxide by a dry process is shown in FIG. 5. In this case, erbium oxide particles having an average size of 300 to 400 nm merely adhered to recesses of the positive electrode active material particles; and the state provided by the fixing by the wet process where erbium compound particles having an average size of 100 nm or less adhere in a dispersed form was not observed.

The amount of the erbium compound fixed was measured by inductively coupled plasma (ICP) analysis and was found to be 0.12 mass % relative to lithium cobaltate in terms of erbium element.

(2) Preparation of Positive Electrode

The thus-prepared positive electrode active material, a carbon black (acetylene black) powder having an average particle size of 30 nm serving as a positive electrode conductive agent, and polyvinylidene fluoride (PVdF) serving as a positive electrode binder were kneaded together such that the mass ratio thereof was 95:2.5:2.5. Then, the kneaded product was mixed with a solution prepared by mixing aluminum bis(ethyl acetoacetate) mono(acetylacetonate) with N-methyl-2-pyrrolidone such that the proportion of aluminum bis(ethyl acetoacetate) mono(acetylacetonate) was 50 mass % and further kneaded to prepare a positive electrode active material slurry (positive electrode mixture slurry). Then, this positive electrode mixture slurry was applied to the two surfaces of an aluminum foil serving as a positive electrode collector and dried. Then, the resultant aluminum foil was rolled to prepare a positive electrode. The packing density of the positive electrode active material was 3.60 g/cc. The content of the aluminum bis(ethyl acetoacetate) mono(acetylacetonate) was 0.15 mass % relative to the entire amount of the positive electrode active material, conductive agent, and PVdF.

Preparation of Negative Electrode

A carbon material (graphite), sodium carboxymethyl cellulose (CMC), and styrene-butadiene rubber (SBR) were mixed in an aqueous solution such that the mass ratio thereof was 98:1:1 to prepare a negative electrode active material slurry. Then, this negative electrode active material slurry was applied to the two surfaces of a copper foil and dried. The resultant copper foil was rolled to prepare a negative electrode. The packing density of the negative electrode active material was 1.75 g/cc.

Preparation of Nonaqueous Electrolytic Solution

A solvent in which ethylene carbonate (EC) and diethyl ethyl carbonate (DEC) were mixed together in a volume ratio of 3:7 was prepared. Lithium phosphate hexafluoride ($LiPF_6$) was dissolved in this solvent in a concentration of 1 mole/liter to prepare a nonaqueous electrolytic solution.

Preparation of Battery

Lead terminals were attached to the positive electrode and the negative electrode. These electrodes were stacked so as to sandwich a separator therebetween and wound in a spiral fashion around a winding core. Then, the winding core was pulled out to provide a spiral electrode assembly. This electrode assembly was compressed into a flat electrode assembly. Then, this flat electrode assembly and the above-described electrolytic solution were put into a casing constituted by an aluminum laminate to prepare a nonaqueous electrolytic secondary battery. This secondary battery had dimensions of 3.6 mm×35 mm×62 mm. When the secondary battery was charged to 4.40 V, the design capacity thereof was 780 mAh.

Figure 1:
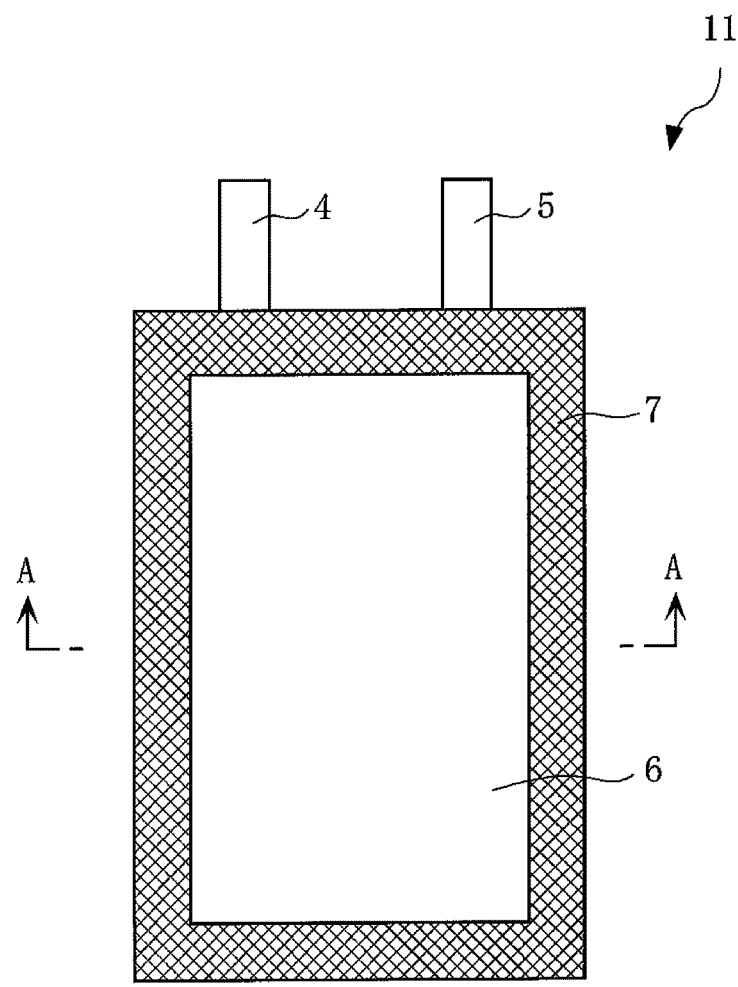
FIG. 1 is a front view of a test battery according to an embodiment of the present invention.
Figure 2:
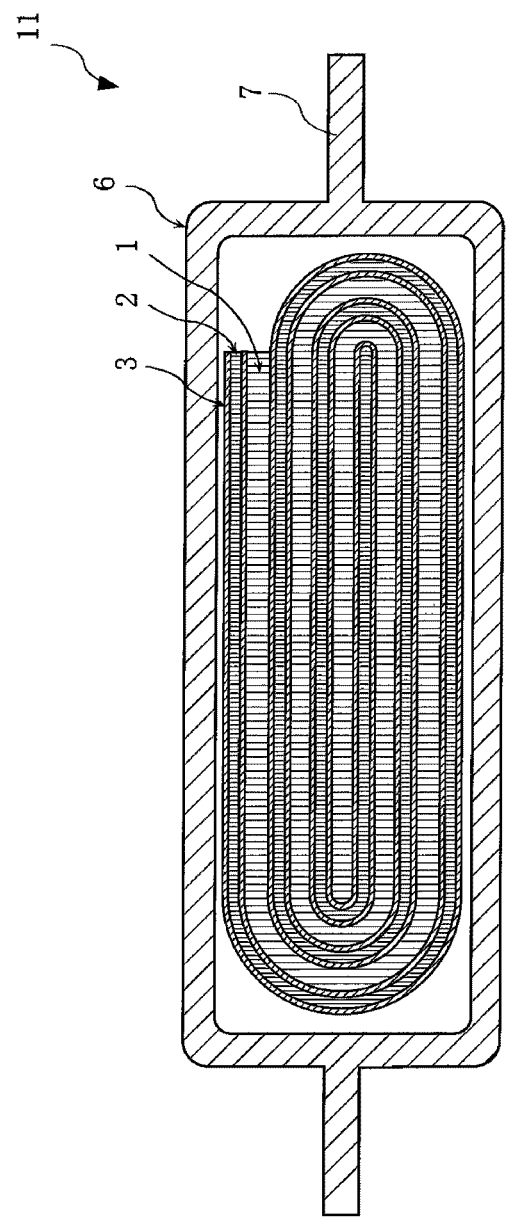
FIG. 2 is a sectional view taken along line A-A and viewed in the direction of the arrows in FIG. 1.

FIGS. 1 and 2 illustrate the specific structure of such a nonaqueous electrolytic secondary battery 11. A positive electrode 1 and a negative electrode 2 are disposed so as to face each other with a separator 3 therebetween. The flat electrode assembly constituted by the positive electrode 1, the negative electrode 2, and the separator 3 is impregnated with the nonaqueous electrolytic solution. The positive electrode 1 and the negative electrode 2 are respectively connected to a positive electrode collector tab 4 and a negative electrode collector tab 5 so that a secondary battery structure allowing charging and discharging is provided. The electrode assembly is disposed within the space of an aluminum-laminate casing 6 having a sealed portion 7 formed by heat-sealing the peripheries of casing parts together.

EXAMPLES

First Example

Example 1

The battery described in the "DETAILED DESCRIPTION OF THE INVENTION" was used.

Hereafter, the thus-prepared battery will be referred to as Example battery A1.

Example 2

A battery was prepared as in Example 1 except that the heat-treatment temperature in Example 1 was changed to 120° C. When the heat-treatment temperature is 120° C., erbium hydroxide does not turn into erbium oxyhydroxide. Thus, erbium hydroxide was fixed on the surfaces of the positive electrode active material particles in a dispersed form.

Hereafter, the thus-prepared battery will be referred to as Example battery A2.

Comparative Example 1

A battery was prepared as in Example 1 except that no coupling agent was added to the positive electrode active material slurry.

Hereafter, the thus-prepared battery will be referred to as Comparative battery Z1.

Comparative Example 2

A battery was prepared as in Example 2 except that no coupling agent was added to the positive electrode active material slurry.

Hereafter, the thus-prepared battery will be referred to as Comparative battery Z2.

Comparative Example 3

A battery was prepared as in Example 1 except that the heat-treatment temperature in Example 1 was changed to 600° C. When the heat-treatment temperature is 600° C., erbium hydroxide turns into erbium oxide. Thus, erbium oxide was fixed on the surfaces of the positive electrode active material particles in a dispersed form.

Hereafter, the thus-prepared battery will be referred to as Comparative battery Z3.

Comparative Example 4

A battery was prepared as in Comparative example 3 except that no coupling agent was added to the positive electrode active material slurry.

15

Hereafter, the thus-prepared battery will be referred to as Comparative battery Z4.

Comparative Example 5

A battery was prepared as in Example 2 except that 1.91 g of zirconium oxynitrate dihydrate was used instead of erbium nitrate pentahydrate. The amount of zirconium relative to lithium cobaltate was made the same number of moles as that of erbium in Example 2 and hence was 0.065 mass % in terms of zirconium element.

Hereafter, the thus-prepared battery will be referred to as Comparative battery Z5.

Comparative Example 6

A battery was prepared as in Comparative example 5 except that no coupling agent was added to the positive electrode active material slurry.

Hereafter, the thus-prepared battery will be referred to as Comparative battery Z6.

Comparative Example 7

A battery was prepared as in Example 1 except that 1.91 g of zirconium oxynitrate dihydrate was used instead of erbium nitrate pentahydrate. The amount of zirconium relative to lithium cobaltate was made the same number of moles as that of erbium in Example 1 and hence was 0.065 mass % in terms of zirconium element.

Hereafter, the thus-prepared battery will be referred to as Comparative battery Z7.

Comparative Example 8

A battery was prepared as in Comparative example 7 except that no coupling agent was added to the positive electrode active material slurry.

Hereafter, the thus-prepared battery will be referred to as Comparative battery Z8.

Experiments

Example batteries A1 and A2 and Comparative batteries Z1 to Z8 were charged and discharged under conditions below and measured in terms of initial charging-discharging efficiency, remaining capacity percentage, and amount of swelling. The results are summarized in Table 3 below.

Charging-Discharging Conditions

First-Cycle Charging Condition

Each battery was charged at a constant current of 1 C (750 mA) until the voltage of the battery reached 4.40 V and then charged at a constant voltage of 4.40 V until the current of the battery reached 37.5 mA.

16

First-Cycle Discharging Condition

Each battery was discharged at a constant current of 1 C (750 mA) until the voltage of the battery reached 2.75 V.

Pause

The pause between the charging and the discharging was 10 minutes.

Measurement of Initial Charging-Discharging Efficiency

Each battery was subjected to a charging-discharging cycle test once under the charging-discharging conditions and the initial discharging capacity Qo and the initial charging capacity Q1 of the battery were measured. The initial charging-discharging efficiency was calculated from these capacities with the following formula (1).

$$\text{Initial charging-discharging efficiency} = \{(\text{initial discharging capacity } Qo)/(\text{initial charging capacity } Q1)\} \times 100 (\%) \quad (1)$$

Continuous Charging at 60° C.

Each battery was subjected to a charging-discharging cycle test once at 1 C-rate and the discharging capacity Q2 (discharging capacity Q2 before a continuous charging test) of the battery was measured. Then, the battery was left in a constant temperature oven at 60° C. for an hour. Subsequently, in the environment at 60° C., the battery was charged at a constant current of 750 mA until the voltage of the battery reached 4.40 V and then charged at a constant voltage of 4.40 V for 64 hours.

Measurement of Amount of Swelling of Battery

Figure 3:
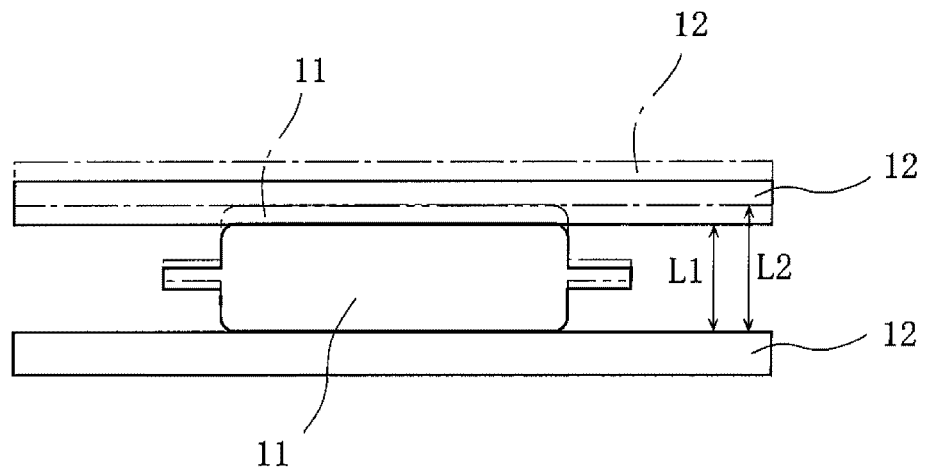
FIG. 3 illustrates the measurement of the thickness of a battery.

The amount of swelling of each battery was measured in the following manner. Referring to FIG. 3, the battery 11 was sandwiched between two flat plates 12 in a manner such that the two surfaces having the largest area in the battery 11 were in contact with the flat plates 12. The distance (battery thickness) between these flat plates 12 was measured after the first-cycle discharging and after the charging-discharging cycle test. The battery thickness after the first-cycle discharging was defined as L1 (hereafter, simply referred to as battery thickness L1) and the battery thickness after the charging-discharging cycle test was defined as L2 (hereafter, simply referred to as battery thickness L2). The amount of swelling of the battery 11 was calculated from these thicknesses with the following formula (2).

$$\text{Amount of swelling} = (\text{battery thickness } L2) - (\text{battery thickness } L1) \quad (2)$$

Measurement of Remaining Capacity Percentage

After the amount of swelling was measured, each battery was cooled to room temperature. Then, at room temperature, the discharging capacity (first discharging capacity Q3 after the continuous charging test) of the battery was measured. The remaining capacity percentage of the battery was then calculated with the following formula (3).

$$\text{Remaining capacity percentage} = \{(\text{first discharging capacity } Q3 \text{ after the continuous charging test})/(\text{discharging capacity } Q2 \text{ before the continuous charging test})\} \times 100 (\%) \quad (3)$$

TABLE 3

| | Coupling agent | | | | Initial charging-discharging efficiency (%) | Remaining capacity percentage (%) | Amount of swelling (mm) |
|---|---|---|---|---|---|---|---|
| Battery | Fixed element | | | Addition amount (mass %) | | | |
| | Element | State | Addition | | | | |
| Example battery A1 | Er | Oxyhydroxide | Added | 0.15 | 89 | 91.5 | 0.31 |

TABLE 3-continued

| Battery | Fixed element Element | Fixed element State | Coupling agent Addition | Coupling agent Addition amount (mass %) | Initial charging-discharging efficiency (%) | Remaining capacity percentage (%) | Amount of swelling (mm) |
|---|---|---|---|---|---|---|---|
| Example battery A2 | | Hydroxide | Added | 0.15 | 89 | 89.5 | 0.42 |
| Comparative battery Z1 | | Oxyhydroxide | None | — | 89 | 87.6 | 0.52 |
| Comparative battery Z2 | | Hydroxide | None | — | 89 | 84.5 | 0.62 |
| Comparative battery Z3 | | Oxide | Added | 0.15 | 86 | 78.6 | 1.08 |
| Comparative battery Z4 | | Oxide | None | — | 86 | 78.5 | 1.52 |
| Comparative battery Z5 | Zr | Hydroxide | Added | 0.15 | 89 | 75.5 | 2.78 |
| Comparative battery Z6 | | Hydroxide | None | — | 89 | 74.5 | 3.78 |
| Comparative battery Z7 | | Oxide | Added | 0.15 | 87 | 74.8 | 2.80 |
| Comparative battery Z8 | | Oxide | None | — | 87 | 74.4 | 3.84 |

In all the cases where the coupling agent was added, the coupling agent was aluminum bis(ethyl acetoacetate) mono(acetylacetonate).

Table 3 shows that, in Example batteries A1 and A2 in which the hydroxide and oxyhydroxide of erbium (rare earth) are fixed on the surfaces of positive electrode active material particles and a coupling agent is contained, the initial charging-discharging efficiency and the remaining capacity percentage are high and battery swelling is suppressed.

In contrast, in Comparative batteries Z1 and Z2, the hydroxide and oxyhydroxide of erbium are fixed on the surfaces of positive electrode active material particles but no coupling agent is contained. Since no coupling agent is contained, a stable film is not formed around the erbium hydroxide and erbium oxyhydroxide and, as a result, the remaining capacity percentage is low and battery swelling is large.

In Comparative batteries Z5 and Z6 in which the hydroxide of zirconium (not rare earth) is fixed on the surfaces of positive electrode active material particles, the remaining capacity percentage is low and battery swelling is large. For Comparative battery Z6 containing no coupling agent, this result is caused by the same reason as in Comparative battery Z1. For Comparative battery Z5 containing the coupling agent, the result is probably caused because zirconium cannot completely suppress catalytic property of nickel and cobalt and hence the electrolytic solution is decomposed.

In Comparative batteries Z3, Z4, Z7, and Z8 in which the oxides of erbium and zirconium are fixed on the surfaces of positive electrode active material particles, regardless of the presence or absence of the coupling agent in these batteries, the initial charging-discharging efficiency and the remaining capacity percentage are low and battery swelling is large. The reasons for these results are probably as follows. Since the oxides of erbium and zirconium are prepared at high heat-treatment temperature, erbium and zirconium partially diffuse in positive electrode active material particles and hence the initial charging-discharging efficiency is decreased. In addition, since the coupling agent is not fixed around the oxides of erbium and zirconium but is locally fixed on lithium cobaltate regions, the interaction between the coupling agent and the substances fixed on the surfaces of positive electrode active material particles is not achieved and hence the remaining capacity percentage is low and battery swelling is large.

Second Example

Example

A battery was prepared as in Example 1 of "First example" except that 3.06 g of lanthanum nitrate hexahydrate was used instead of erbium nitrate pentahydrate. The amount of lanthanum relative to lithium cobaltate was made the same number of moles as that of erbium in Example 1 and hence was 0.098 mass % in terms of lanthanum element.

Hereafter, the thus-prepared battery will be referred to as Example battery B.

Comparative Example

A battery was prepared as in Example of "Second example" except that no coupling agent was added to the positive electrode active material slurry.

Hereafter, the thus-prepared battery will be referred to as Comparative battery Y.

Experiments

Example battery B and Comparative battery Y were charged and discharged under the same conditions as in "Experiments" of "First example" and measured in terms of initial charging-discharging efficiency, remaining capacity percentage, and amounts of swelling of batteries in the same manner as in "Experiments" of "First example". The results are summarized in Table 4 below.

TABLE 4

| Battery | Fixed element | | Coupling agent | | Initial charging-discharging efficiency (%) | Remaining capacity percentage (%) | Amount of swelling (mm) |
| --- | --- | --- | --- | --- | --- | --- | --- |
| | Element | State | Addition | Addition amount (mass %) | | | |
| Example battery B | La | Oxyhydroxide | Added | 0.15 | 89 | 89.1 | 0.53 |
| Comparative battery Y | | | None | — | 89 | 84.3 | 0.90 |

The coupling agent was aluminum bis(ethyl acetoacetate) mono(acetylacetonate).

Table 4 shows that, in Example battery B in which the oxyhydroxide of lanthanum (rare earth) is fixed on the surfaces of positive electrode active material particles and a coupling agent is contained, the remaining capacity percentage is high and battery swelling is suppressed, compared with Comparative battery Y containing no coupling agent. This result is probably caused by the same reason as in "Experiments" of "First example".

Third Example

Example 1

A battery was prepared as in Example 1 of "First example" except that aluminum ethyl acetate diisopropylate was used as the coupling agent instead of aluminum bis(ethyl acetoacetate) mono(acetylacetonate).

Hereafter, the thus-prepared battery will be referred to as Example battery C1.

Example 2

A battery was prepared as in Example 1 of "First example" except that aluminum tris(ethyl acetoacetate) was used as the coupling agent instead of aluminum bis(ethyl acetoacetate) mono(acetylacetonate).

Hereafter, the thus-prepared battery will be referred to as Example battery C2.

Experiments

Example batteries C1 and C2 were charged and discharged under the same conditions as in "Experiments" of "First example" and measured in terms of initial charging-discharging efficiency, remaining capacity percentage, and amounts of swelling of batteries in the same manner as in "Experiments" of "First example". The results are summarized in Table 5 below.

Table 5 shows that, in Example batteries C1 and C2 in which aluminum ethyl acetate diisopropylate and aluminum tris(ethyl acetoacetate) are used, the initial charging-discharging efficiency and the remaining capacity percentage are high and battery swelling is suppressed.

The present invention can be applied to, for example, the driving power supply of mobile terminal devices such as cellular phones, notebook computers, and PDAs and, in particular, in the cases where high capacity is required. In addition, the application of the present invention is also expected in the cases where batteries are required to have high output and continuously operate at high temperature under severe operational environments, for example, for hybrid electric vehicles (HEVs) or electric tools.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A positive electrode for a nonaqueous electrolytic secondary battery, the positive electrode comprising a positive electrode active material layer, wherein the positive electrode active material layer contains a positive electrode active material and at least one coupling agent represented by a general formula (1) below, the positive electrode active material includes lithium transition metal oxide particles that contain nickel and/or cobalt, and at least one rare-earth compound selected from the rare-earth compound group consisting of erbium hydroxide, erbium oxyhydroxide, ytterbium hydroxide, ytterbium

TABLE 5

| Battery | Fixed element | | Coupling agent | | Initial charging-discharging efficiency (%) | Remaining capacity percentage (%) | Amount of swelling (mm) |
| --- | --- | --- | --- | --- | --- | --- | --- |
| | Element | State | Addition (added agent) | Addition amount (mass %) | | | |
| Example battery C1 | Er | Oxyhydroxide | Added (Compound 1) | 0.15 | 89 | 90.8 | 0.33 |
| Example battery C2 | | | Added (Compound 2) | | 89 | 90.9 | 0.32 |

Compound 1: aluminum ethyl acetate diisopropylate
Compound 2: aluminum tris(ethyl acetoacetate)

oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, yttrium oxyhydroxide, scandium hydroxide, and scandium oxyhydroxide, is fixed on surfaces of the lithium transition metal oxide particles in a dispersed form,

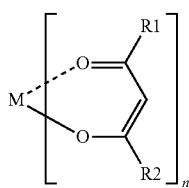

(1)

where M represents Al to which a functional group may be bonded; R1 and R2 each independently represent an alkyl group including 18 or less carbon atoms or an alkoxy group including 18 or less carbon atoms; R1 and R2 may be the same as or different from each other; the alkyl group and the alkoxy group may be independently linear or branched; n is an integer of 1, 2 or 3; and when n is 2 or 3, a plurality of R1 may be the same as or different from each other and a plurality of R2 may be the same as or different from each other.

2. The positive electrode according to claim 1, wherein the rare-earth compound group consists of erbium hydroxide, erbium oxyhydroxide, lanthanum hydroxide, and lanthanum oxyhydroxide.

3. The positive electrode according to claim 2, wherein the at least one rare-earth compound has an average particle size of 1 nm or more and 100 nm or less.

4. The positive electrode according to claim 3, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

5. The positive electrode according to claim 2, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

6. The positive electrode according to claim 1, wherein the at least one rare-earth compound has an average particle size of 1 nm or more and 100 nm or less.

7. The positive electrode according to claim 6, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

8. The positive electrode according to claim 1, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

9. A nonaqueous electrolytic secondary battery comprising:
a positive electrode comprising a positive electrode active material which includes lithium transition metal oxide particles that contain nickel and/or cobalt;
a negative electrode;
a separator;
a nonaqueous electrolytic solution; and
a casing within which the positive electrode, the negative electrode, the separator, and the nonaqueous electrolytic solution are disposed,
wherein at least one rare-earth compound selected from the rare-earth compound group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, yttrium oxyhydroxide, scandium hydroxide, and scandium oxyhydroxide, is fixed on surfaces of the positive electrode active material particles in a dispersed form, and
a coupling agent represented by a general formula (1) below is contained within the casing,

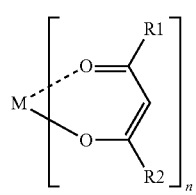

(1)

where M represents Al to which a functional group may be bonded; R1 and R2 each independently represent an alkyl group including 18 or less carbon atoms or an alkoxy group including 18 or less carbon atoms; R1 and R2 may be the same as or different from each other; the alkyl group and the alkoxy group may be independently linear or branched; n is an integer of 1, 2 or 3; and when n is 2 or 3, a plurality of R1 may be the same as or different from each other and a plurality of R2 may be the same as or different from each other.

10. The nonaqueous electrolytic secondary battery according to claim 9, wherein the rare-earth compound group consists of erbium hydroxide, erbium oxyhydroxide, lanthanum hydroxide, and lanthanum oxyhydroxide.

11. The nonaqueous electrolytic secondary battery according to claim 10, wherein the at least one rare-earth compound has an average particle size of 1 nm or more and 100 nm or less.

12. The nonaqueous electrolytic secondary battery according to claim 11, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

13. The nonaqueous electrolytic secondary battery according to claim 10, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

14. The nonaqueous electrolytic secondary battery according to claim 9, wherein the at least one rare-earth compound has an average particle size of 1 nm or more and 100 nm or less.

15. The nonaqueous electrolytic secondary battery according to claim 14, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

16. The nonaqueous electrolytic secondary battery according to claim 9, wherein the coupling agent is at least one selected from the group consisting of aluminum bis(ethyl acetoacetate) mono(acetylacetonate), aluminum ethyl acetate diisopropylate, and aluminum tris(ethyl acetoacetate).

* * * * *